United States Patent [19]

MacMaster et al.

[11] Patent Number: 4,763,043

[45] Date of Patent: Aug. 9, 1988

[54] P-N JUNCTION SEMICONDUCTOR SECONDARY EMISSION CATHODE AND TUBE

[75] Inventors: George H. MacMaster, Lexington; Lawrence J. Nichols, Burlington, both of Mass.

[73] Assignee: Raytheon Company, Lexington, Mass.

[21] Appl. No.: 812,155

[22] Filed: Dec. 23, 1985

[51] Int. Cl.[4] ........................ H01J 31/26; H04N 3/14

[52] U.S. Cl. ................................ 315/5.12; 313/103 R; 313/446; 313/399; 313/352; 313/387; 315/5.11; 315/3.6; 315/39.3; 315/12.1; 330/42; 330/308; 330/44; 357/29; 357/13

[58] Field of Search .................... 315/3.5, 39.3, 39.51, 315/3, 5.11, 5.12; 313/103, 105, 107, 444, 542, 390, 103 CM, 105 CM, 387, 446, 399; 330/42; 357/13, 29

[56] References Cited

U.S. PATENT DOCUMENTS

| | | | |
|---|---|---|---|
| 3,244,922 | 4/1966 | Wolfgang | 313/103 |
| 3,458,754 | 7/1969 | Peters, Jr. | 315/39.3 |
| 3,646,388 | 2/1972 | Dudley et al. | 315/39.3 |
| 4,200,821 | 4/1980 | Bekefi et al. | 315/39.51 |
| 4,325,084 | 4/1982 | van Gorkom et al. | 313/446 |
| 4,331,506 | 5/1982 | Sasano et al. | 313/390 |
| 4,410,833 | 10/1983 | Ganguly et al. | 315/39.51 |
| 4,434,387 | 2/1984 | MacMaster et al. | 315/39.3 |
| 4,513,308 | 4/1985 | Greene et al. | 313/387 |
| 4,556,817 | 12/1985 | Kusano et al. | 313/390 |
| 4,574,216 | 3/1986 | Hoeberechts et al. | 313/390 |
| 4,677,342 | 6/1987 | MacMaster et al. | 315/39.3 |

*Primary Examiner*—David K. Moore
*Assistant Examiner*—Mark R. Powell
*Attorney, Agent, or Firm*—Martin M. Santa; Richard M. Sharkansky

[57] ABSTRACT

A crossed-field amplifier has a cathode in the form of a P-N junction semiconductor which is biased to the conductive state to cause the crossed-field amplifier to amplify. The P and N regions of the semiconductor are connected to an energy source which is pulsed to produce conduction in the P-N junction and thereby allow secondary emission from the cathode. A reverse bias voltage prevents secondary emission from the cathode. The tube requires only low voltages to be applied to the cathode P-N junction to completely deactivate the crossed-field amplifier tube without requiring the removal of the RF drive pulse applied to the cathode- or anode-slow-wave circuit and without requiring the removal of the DC high voltage power supply which therefore need not be pulsed.

15 Claims, 4 Drawing Sheets

P-N JUNCTION SEMICONDUCTOR SECONDARY EMISSION CATHODE AND TUBE

BACKGROUND OF THE INVENTION

This invention relates to secondary emitter cathodes and more particularly to semiconductor cathodes in the form of a P-N junction which may be made conductive or non-conductive by a pulsed source to provide or not provide, respectively, a secondary electron emission and, in a preferred embodiment, to turn-on or turn-off, respectively, a crossed field amplifier.

Crossed-field amplifier tubes (CFAs) are usually used only in the one or two highest-power stages of an amplifier chain, where their efficiency is significant, and are usually preceded by a medium power traveling wave or klystron tube which provide most of the chain gain. CFAs may be of the reentrant type where the DC electric field between the anode and cathode and the transverse DC magnetic field cause the electrons emitted from the cathode to be accelerated by the electric field and gain velocity, but the greater the velocity, the more the path of the electrons is bent by the magnetic field. As a result, in the absence of an RF field in the interaction space between the cathode and anode, the electrons are bent back to impinge upon the cathode without reaching the anode and, ideally there is no current through the tube. An RF field of the correct frequency will interact with some of these electrons to extract energy from them and cause them to reach the anode and produce an anode current.

In CFAs, it is possible in most cases to use a cold cathode. Even with a "good" vacuum inside the tube, there are sufficient gas molecules present so that some will be ionized when sufficient RF power is provided to the input of the CFA. Some of the free electrons thus produced will be driven back to the cathode. Alternatively, the high RF electric field at the cathode may produce these free electrons by field emission effects from the cathode. The returning electrons will initiate secondary emission from suitable cathode material and full cathode current will very rapidly build up. Under high average power condition, cooling of the cathode may be necessary to prevent overheating. Removal of the applied RF electric field does not cause the tube to immediately cease conducting thereby resulting in oscillation or noise output unless the DC electric field is also removed.

In the prior art, cold secondary emitter cathodes of the non-semiconductor type were used in crossed-field amplifier tubes. These tubes may contain an auxiliary non-emitting control electrode located between the cathode and the anode of the amplifier. A tube operating directly from a DC supply may be turned off with a control voltage pulse (positive with respect to the cathode) applied to the control electrode at the time of removal of the RF drive pulse to collect electrons passing through the drift region and to cause the tube to turn off even though high voltage is still applied. The control electrode forms a segment within a drift region of the periphery of the cylindrical surface of the cathode but insulated from it. A disadvantage of the prior art pulsing technique is that the cut-off $\mu$, the ratio of the anode voltage to cut-off voltage, is low, approximately 3.0. The cut-off current drawn by the control electrode is approximately 25% of the rated beam current. Cooling of the control electrode is difficult because it is electrically insulated from the cathode which is also cooled to prevent thermionic emission. Also, since a DC-operated control electrode CFA must withstand full DC voltage continuously without breakdown, its peak-power rating cannot be made as great as that of a comparable cathode-pulsed tube.

SUMMARY OF THE INVENTION

The aforementioned problems are overcome and other objects and advantages of solid state switching of a crossed-field amplifier are provided by a tube, in accordance with the invention, which comprises a crossed-field amplifier having a cathode in the form of a P-N junction semiconductor. The P and N regions of the semiconductor are connected to an energy source which is pulsed to produce conduction in the P-N junction and thereby allow secondary emission. A reverse bias voltage prevents secondary emission from the cathode. The tube of the invention requires only low voltages to be applied to the cathode solid state P-N junction and is capable of completely deactivating the microwave amplifier tube even without the removal of the RF drive pulse or the DC high voltage power supply which need not be pulsed. The tube of this invention will typically have $\mu$'s of 100 and cut-off currents of a fraction of a percent of the rated beam current. In addition, during the interpulse period, the amplifier tube remains completely passive.

BRIEF DESCRIPTION OF THE DRAWINGS

The aforementioned aspects and other features of the invention are explained in the following description taken in conjunction with the accompanying drawings wherein.

DESCRIPTION OF THE PREFERRED EMBODIMENT

Figure 1:
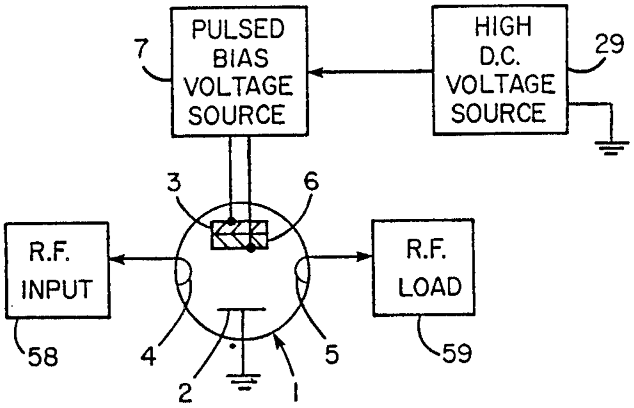
FIG. 1 is a schematic view of a crossed-field amplifier incorporating the switched P-N junction cathode of the invention.

Referring now to FIG. 1, there is shown a schematic view of an embodiment of the invention in the form of a crossed-field amplifier tube 1. Tube 1 comprises an anode 2, a cathode 3, and slow-wave structure(s) shown as the input loop 4 and output loop 5. The slow-wave structure(s) are integral with the anode alone or both the anode and cathode. The loops 4 and 5 represent the input and output coupling to the slow-wave structure(s). The cathode 3 is a P-N junction 6 semiconductor where the semiconductor is selected from a material whose secondary emission is greater than one. Suitable materials are gallium arsenide, cadmium sulfied and cadmium telluride. A pulsed bias voltage source 7 is connected across the P-N junction 6 of cathode 3 to bias the junction into conduction to allow secondary emission or to strongly back bias the junction to prevent second emission. The high DC voltage source 29 may be continuously applied to the tube 1. The microwave signal from source 58 applied to the slow-wave input 4 appears amplified at the load 59 of the output 5 of the slow-wave structure when the cathode junction 6 is in the conduction state. No amplification occurs when the junction is biased highly into cutoff. The secondary emitting surface of the cathode 3 may be either the P-type or the N-type material forming the semiconductor junction 6.

In order to be useful as a cold cathode, the semiconductor material from which the cathode is made in the form of a P-N junction must have a secondary emission ratio greater than one. The secondary emission ratio is the ratio of the average number of electrons emitted from the surface of the cathode for each electron which strikes the cathode with a given amount of energy. In the preferred semiconductor materials, gallium arsenide, cadmium sulfide and cadmium telluride, the secondary emission is greater than one for electron energy levels corresponding to approximately 50–75 volts. Therefore, a tube made with such a cathode requires a relatively low RF input signal to provide secondary emission and hence amplification.

Figure 2:
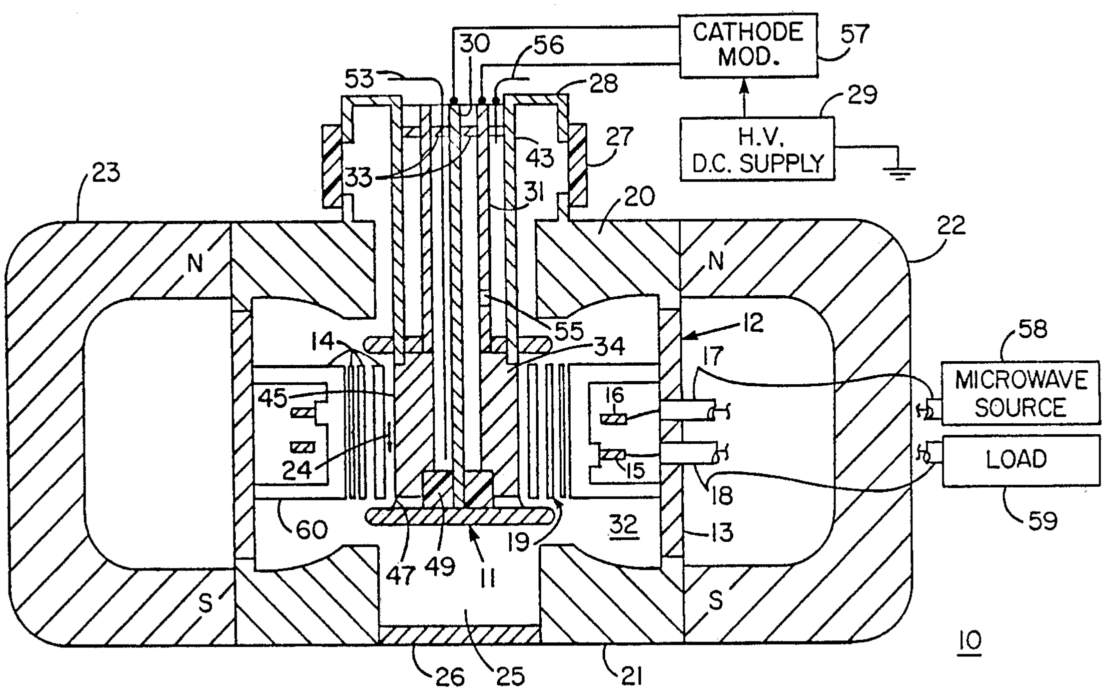
FIG. 2 is a longitudinal cross-sectional view of a crossed-field amplifier having a switched P-N junction cathode and a slow-wave structure anode.

FIG. 2 shows a longitudinal cross-sectional view of a crossed-field amplifier tube 10 which incorporates the solid state switchable semiconductor cathode 11 of this invention. The tube 10 comprises in addition to the cathode 11 a conventional anode 12 comprising a cylindrical electrically conductive shell 13 to which radially extending vanes 14 are electrically attached. Alternate vanes 14 are electrically connected to straps 15, 16, respectively, to complete the slow-wave anode structure. The straps 15, 16 have a radial gap extending circumferentially over the spacing between two or more adjacent vanes 14. An input RF connector is attached to one of the vanes 15, 16 on one side of the gap and an output RF connector is connected to the other of the vanes 15, 16 on the other side of the gap. There is an interaction region 19 between the cathode 11 and the vanes 14. The tube 10 also comprises soft iron magnetic pole pieces 20, 21 which are brazed to the opposite ends of the cylindrical shelf 13 of the anode. Magnets 22, 23, in contact with the pole pieces 20, 21, provide an axial field as shown by direction arrow 24 in the interaction space 19 between the anode 12 and cathode 11. The center hole 25 of the pole piece 21 is sealed with vacuum seal 26. The upper pole piece 20 supports the cathode 11 with a ceramic insulator 27 and a metallic spacer 28. The ceramic insulator 27 is capable of withstanding the high voltage provided by the high voltage DC supply 29 which is connected between the cathode and ground. The anode 12 is also grounded and is placed between the high voltage supply 29 and the cathode 11 and provides a modulating pulse between the conductors 30, 31 of the cathode 11. Electrically non-conducting seal 33 provides a vacuum seal between conductors 30, 31. The interior region 32 of tube 10 is a vacuum region enclosed by the cathode 11, insulator 27, pole pieces 20, 21, shell 13, RF connectors 17, 18, and vacuum seals 26, 33.

Figure 3:
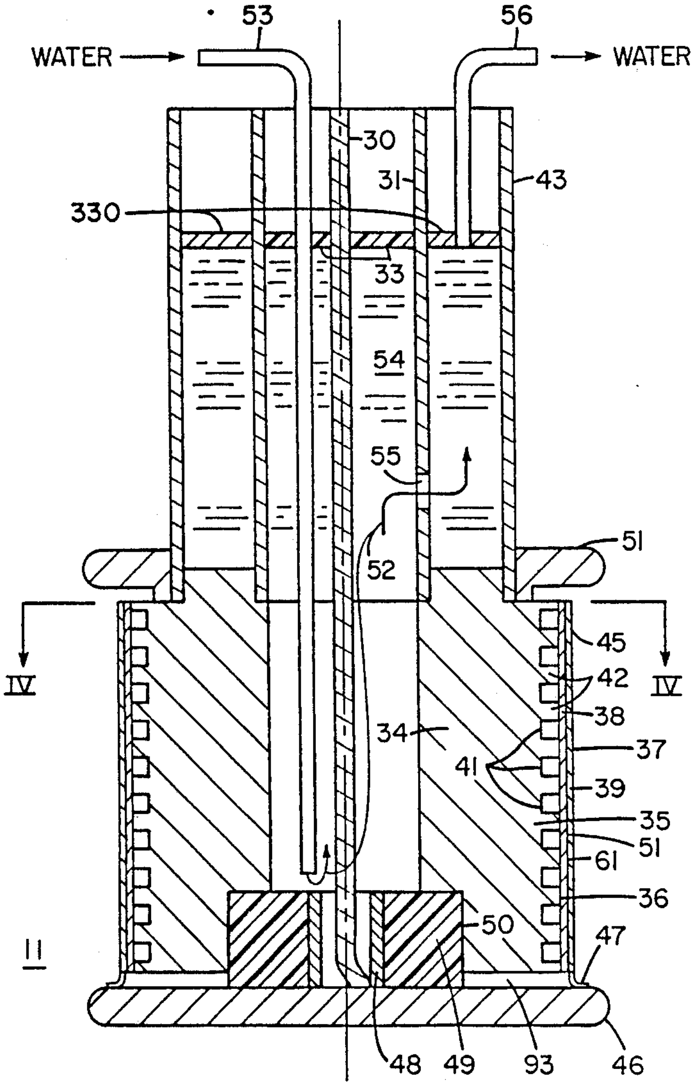
FIG. 3 is a more detailed longitudinal sectional view of the cathode of FIG. 2 taken along section lines III—III of FIG. 4.

Referring now to FIG. 3, there is shown in detail the structure of the cathode 11 of FIG. 2. Reference should also be made to the sectioned perspective view in FIG. 4 of the cathode taken along a section line corresponding to III—III of FIG. 3. The cathode 11 comprises a cylindrical heat sink having radially extending portions 35. The number of radially extending portions and their circumferential extent should correspond with the number of vanes and their circumferential extent of the anode slow-wave structure in order to reduce spurious modes within the amplifier tube for reasons well known to those skilled in the art. The outermost surface of the radially projecting portion 35 is electrically and mechanically bonded to a solid state semiconductor material 37 containing a PN junction with the N material 38 in contact with the portion 35 and the P region 39 facing the interaction region 19 of the tube. The most exterior portion of the regions 35 have axial grooves 40 and circumferential grooves 41 leaving square surface regions 42 to which the semiconductor material 37 is bonded. The resulting reduction in the area of contact of the radial projection 35 with the semiconductor material 37 reduces the mechanical stresses imposed upon the semiconductor material by the temperature change experienced by the cathode from ambient temperature to its normal operating temperature. Electrical connection to one terminal of the modulator 57 shown in FIG. 2, is through either or both cylindrical electrical conductors 31, 43. Electrical connection to the P region 39 is made by the electrical conductor 44 which is in the form of a rectangular grid which is in ohmic contact with the P region 39. Conductor 44 is formed in the shape of a grid in order to provide P region surfaces 45 which are in direct contact with impinging electrons so that the secondary emission therefrom is not impeded. Conductor 44 has a tab 47 which is in bonded electrical contact with the cathode end shield 46. End shield 46 is mechanically supported by a cylindrical electrical conductor 48 and a cylindrical ceramic insulator 49 which is bonded at its outer cylindrical surface 50 to the heat sink 34. Electrical conductor 30 is in electric contact with cylinder 48 and electrical connector 31 and 43 are in electrical contact with heat sink 34 thereby providing through the cathode end shield 46 and gridded conductor 44 electrical connections to both sides of the PN junction 51 through the N region 38 and P region 39. Heat sink 34 is in electrical connection with upper cathode end shield 51 and the outer cylindrical electrical conductor 43. Cooling water flow, shown by direction arrows 52, provides cooling for the heat sink 34 which minimizes the thermal expansion of heat sink 34 and the consequent stresses induced in the semiconductor material cathode 37. Pipe 53 penetrates water seal 33 of electrically non-conductive material to provide water near the bottom of heat sink 34 which water flows through the cylindrical chamber formed by heat sink 34, conductor 31, and end shield 46, through the exit hole 55 into the cylindrical chamber formed by conductors 31, 43 from whence the water exits from pipe 56 through water seal 330.

Referring back to FIG. 2, the conductors 30, 31, which are electrically connected to opposite sides of the PN semiconductor material 38, are connected to cathode modulator 57 which is serially connected to the continuous high voltage DC power supply 29. The input and output RF connectors 17, 18 are connected to microwave source 58 and load 59, respectively, Operation of the crossed-field amplifier tube 10 is obtained by providing a microwave frequency from source 58 through the input RF line 17 to one end of the anode slow-wave structure 60 with a load 59 connected to the output RF terminal 18. The cathode modulator 57 provides a voltage pulse of a polarity such that the PN junction of cathode 11 is forward biased. By forward biasing the PN junction, a high density of carriers is injected into the P-type region 39. These carriers diffuse across the P region to the secondary emission surface 45. The tube does not conduct anode current until the RF drive signal is applied by the microwave source 58. Thus, where the microwave source 58 is a continuous microwave source, pulsing of the modulator 57 to a forward bias condition of the PN junction 61 will cause the signal provided by source 58 to be amplified and to appear at the load 59 during the time that the cathode modulator 57 is providing forward biasing. Alternatively, the microwave source may be a pulsed microwave source which is of shorter duration but coincident with the pulse provided by the cathode modulator 57 in which case the amplified microwave energy appearing at the load 59 will be of the same pulse duration as the signal provided by the pulsed microwave source 58. The coincident application of the RF drive signal from source 58 and the forward biasing of the PN junction 61 initiates an electron multiplication process which, assisted by the reentrant electrons bombarding the surface 45 of the cathode 11, generates sufficient secondary emission electrons and hence anode current to allow the device to amplify. The process of obtaining the reentrant electrons in cold cathodes of crossed-field amplifier tubes is well known to those skilled in the art.

The crossed-field amplifier tube 10 is turned off by reverse biasing the PN junction 61 by a negative voltage being applied to the N region 38 relative to the P region 39. When the semiconductor cathode 11 is reversed biased, the P material becomes a nonconductor. In the nonducting state, charges build up on the P surface 45 of the cathode 11 reducing the secondary emission below a level necessary to sustain the anode current. Once the tube has shut off, no further anode current will flow and amplification of the signal provided by the microwave source will cease. The cut-off voltage required to reverse bias the PN junction is in the order of 100 volts. The distributed PN junction semiconductor cathode shown in FIGS. 2–4 has been fabricated in the form of a cathode slow-wave structure which couples strongly to the anode slow-wave structure 60. The resultant RF field produced in the interaction region 19, in conjunction with the DC field between the cathode 11 and the anode 12 and the magnetic field 24 produced by magnets 22, 23, produce the initial electrons from the surface 45 of the cathode 11 and the resulting secondary emission from electrons which return to strike the cathode surface 45 to produce the secondary emission.

Figure 5:
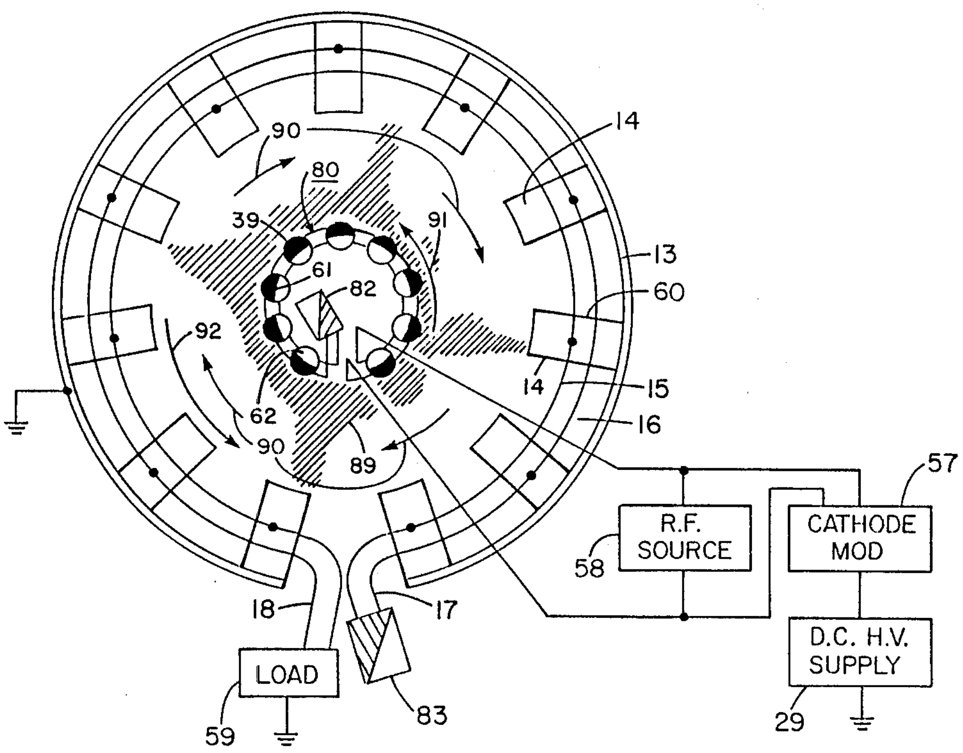
FIG. 5 is an axially transverse cross-sectional schematic view of a crossed-field amplifier tube having both cathode and anode slow-wave structures with the cathode being of the P-N junction semiconductor type.
Figure 6:
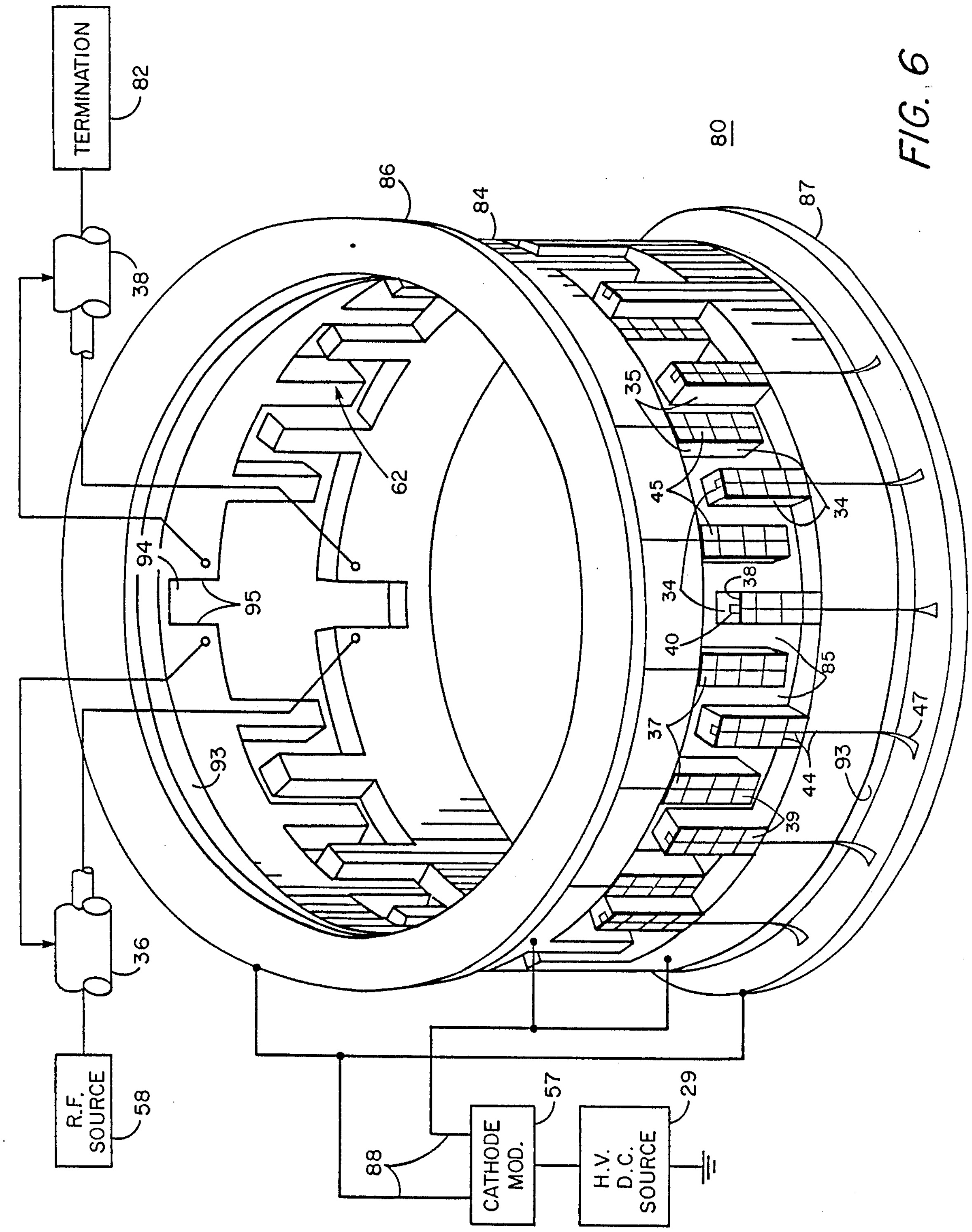
FIG. 6 is an isometric view in partial cross-section of the cathode of FIG. 5 showing in more detail an interdigital slow-wave structure with P-N junction semiconductor emitting surfaces.

It is well known by those skilled in the crossed-field amplifier art that the microwave signal to be amplified may be applied to an input of the slow-wave circuit of the cathode whose other end is terminated in a microwave load. The resultant RF field generated in the interaction region is amplified by the interaction of electrons with the DC voltage between the anode and the cathode and the crossed magnetic field. The switched semiconductor cathode of this invention may be substituted for the cold cathode material used in the prior art cathodes. FIG. 5 shows an axially transverse cross-sectional schematic view of a tube having a PN junction semiconductor cathode 80 and cathode slow-wave structure 62 suitable for excitation by a microwave RF source 58, for causing the PN junction 61 to be conductive by modulation circuitry 57 and for connection to a high voltage DC source 29. The cathode slow-wave structure 62 is also connected by line 38 to a matched termination 82. The details of an illustrative slow-wave line 62 and these connections are shown in FIG. 6. The anode slow-wave anode structure 60 of FIG. 5 may be the same type as that of FIG. 2, the load 59 being connected to the output line 18 and a matched termination 82 being connected to the input line 17. The electronic space charge 89 moves in the direction of direction arrows 90. The cathode and anode slow-waves move in the opposite direction of arrows 91, 92, respectively.

Figure 4:
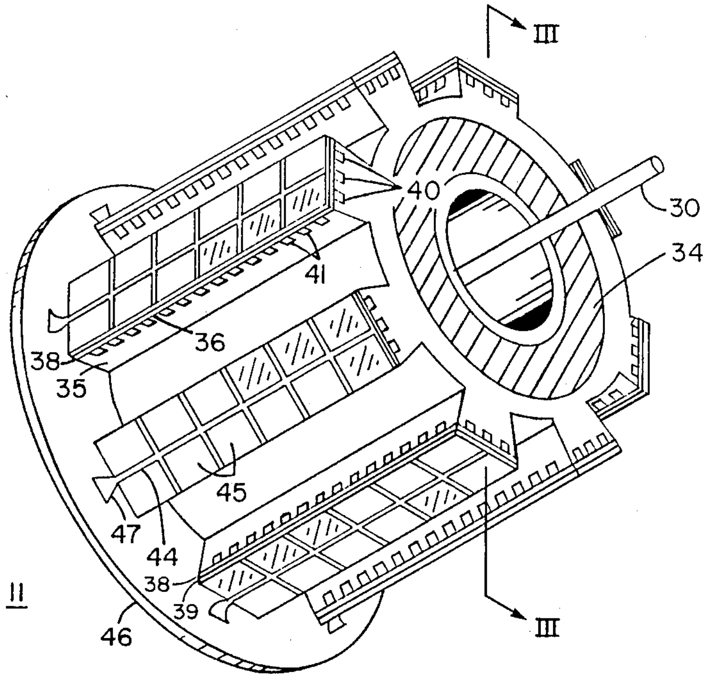
FIG. 4 is an isometric view of the cathode in partial section taken along section lines IV—IV of FIG. 3.

Referring now to FIG. 6, it is seen how the cathode 11 of FIGS. 2–4 may be modified in order to allow the cathode to be used as a source of energy which is to be amplified in the crossed-field amplifier tube. FIG. 6 shows an isometric view of the cathode 80 slow-wave structure 62, the structure 80 having a cylindrical form with the longitudinally centered portion of the structure 62 comprising an interdigital slow-wave line cut through a cylindrical wall 84 to produce finger heat sinks 35 spaced by gaps 85. The slow-wave structure 62 will support a slow-wave propagating around the circumference of the structure. A slot 94 defines ends 95 of the interdigital line which are coupled respectively to the coaxial line 36 connected to an RF source 58 and a coaxial line 38 connected to a RF matched termination 82. The structure 62 is fabricated from an electrically conductive material such as copper. As can be seen in FIG. 6, a perforation at the ends of the gaps 85 progresses completely around the wall 84 to the slot 94 thereby dividing the wall 84 into upper and lower sections supported by electrical insulators 93 to the upper and lower cathode end shields 86, 87, respectively. The P regions 39 of the P-N junction semiconductor material 37 are connected via the grid wires 44, 47 to the cathode end shields 86, 87. The N regions 38 are electrically connected to the interdigital heat sinks 34. The end shields 86, 87 are electrically connected to each other and to one terminal 88 of the cathode modulator 57 and through the high voltage DC supply 29 to ground. The cathode end shields 86, 87 are electrically insulated from cylinder 84 by insulators 93. The heat sinks 34 are connected to the remaining terminal 88 of the modulator 57. Pulsing of the modulator 57 causes conduction of the PN junction of the semiconductor material 37 through grid wires 44 to the heat sinks 34.

In operation, the RF source 58 may continuously supply RF energy to the cathode slow-wave circuit 81 and the high voltage DC source 29 may be continuously applied between the anode (not shown in FIG. 6) and the cathode 80 with RF energy appearing at the anode output 18 into load 59 only when the cathode modulator 57 applies a voltage to the PN junction semiconductor material 37 to cause the junction to become conducting.

Although the illustrative embodiments of the invention have described the outermost surface of the cathode P-N junction as being of P-type material, the N-type material of the junction may alternatively be used as the outer layer with little change in performance of the tube.

Having described a preferred embodiment of the invention, it will be apparent to one of skill in the art that other embodiments incorporating its concept may be used. It is felt, therefore, that this invention should not be limited to the disclosed embodiment but rather should be limited only by the spirit and scope of the appended claims.

What is claimed is:

1. A secondary-emission structure comprising:

a semiconductor material having a P region, an N region separated by a P-N junction;

means forward biasing said P-N junction into the conduction state and for reverse biasing into the non-conduction state;

means producing electrons impacting one of said regions with sufficient energy to produce secondary emission from said one of said regions;

said one region producing secondary emission electrons when said P-N junction is forward biased into the conductive state and not producing secondary emission electrons from said one region when said P-N junction is reverse biased in the non-conduction state.

2. The structure of claim 1 wherein said means producing electrons imparting one of said regions comprises:

means producing an electric field external to and in the vicinity of said one region.

3. The cathode of claim 1 wherein:

said P- and N-type semiconductors regions are gallium arsenide.

4. The cathode of claim 1 wherein:

said P- and N-type semiconductor regions are selected from the group of semiconductor materials consisting of gallium arsenide, cadmium sulfide, and cadmium telluride.

5. A crossed-field amplifier tube of the type having a secondary emission cathode comprising:

a tube having a cathode;

an anode with a slow-wave structure adjacent said cathode and forming an interaction region between said slow-wave structure and said cathode;

said cathode comprising a P-N semiconductor material with a P-N junction;

means applying a biasing voltage across said P-N junction for forward biasing said junction to a conduction state and for reverse biasing to a nonconduction state;

means applying a DC electric field between said anode and said cathode in said interaction region;

means applying a DC magnetic field transverse to said electric field;

means applying an RF signal to said anode slow-wave structure;

means terminating said anode slow-wave structure in a load;

the interaction of the DC magnetic field, the RF signal, and the DC electric field producing electron impact on said cathode; and said cathode providing secondary emission electrons in the interaction region from electrons impacting on the cathode and thereby producing amplification in said tube when the cathode is biased into the conduction state and no amplification when the cathode is biased into the non-conduction state.

6. The tube of claim 5 wherein:

said P-N-type semiconductor material is gallium arsenide.

7. The tube of claim 5 wherein:

said P-N-type semiconductor material is selected from the group of semiconductor materials consisting of gallium arsenide, cadmium sulfide, and cadmium telluride.

8. A crossed-field amplifier tube of the type having a secondary emission cathode comprising:

an anode and a cathode each having a slow-wave structure;

an interaction region between said anode and cathode;

said cathode slow-wave structure having a plurality of surfaces nearest said interaction region;

each one of said surfaces comprising P- and N-type semiconductor material layers with a P-N junction, one of said layers being most adjacent said interaction region;

means for applying a biasing voltage across said P-N junction to bias said junction into conduction and non-conduction states;

said slow-wave structures having an input and an output;

means for applying a microwave signal to the input of said cathode slow-wave structure;

means for applying an RF matched termination to the output of said cathode slow-wave structure;

means for applying an RF matched termination to the input of said anode slow-wave structure;

means for applying a load to the output of said anode slow-wave structure;

means for applying a DC electric field between said anode and said cathode in said interaction space;

means for applying a DC magnetic field transverse to said electric field in said interaction space;

the interaction of said microwave signal on said cathode slow-wave structure, the DC magnetic field, and the DC electric field causing electron impact on said cathode;

whereby the application of a biasing voltage to produce P-N junction conduction results in secondary emission current by said electron impact from the cathode with resultant amplification to the load of the input microwave signal, and the application of said biasing voltage to produce non-conduction of said P-N junction results in no secondary emission current and no amplification of the input microwave signal.

9. The tube of claim 8 wherein:

said P- and N-type semiconductor material layers are selected from the group consisting of gallium arsenide, cadmium sulfide, and cadmium telluride.

10. The secondary emission structure of claim 1 wherein said means biasing said P-N junction into the conduction state and into the non-conduction state is a pulse means.

11. The crossed-field amplifier tube of claim 5 wherein said means applying a biasing voltage across said P-N junction for biasing said junction to a conduction state and to a non-conduction state is a pulse means.

12. The crossed-field amplifier tube of claim 8 wherein said means for applying a biasing voltage across said P-N junction to bias said junction into conduction and non-conduction states is a pulse source.

13. The secondary-emission structure of claim 10 wherein said means biasing said P-N junction provides a conduction voltage sufficient to provide conduction and a reverse voltage below the avalanche breakdown voltage of the P-N junction to be in the non-conduction state.

14. The secondary-emission structure of claim 11 wherein said means biasing said P-N junction provides a conduction voltage sufficient to provide conduction and a reverse voltage below the avalanche breakdown voltage of the P-N junction to be in the non-conduction state.

15. The secondary-emission structure of claim 12 wherein said means biasing said P-N junction provides a conduction voltage sufficient to provide conduction and a reverse voltage below the avalanche breakdown voltage of the P-N junction to be in the non-conduction state.

* * * * *